(12) United States Patent
Yamagishi

(10) Patent No.: US 6,386,502 B1
(45) Date of Patent: May 14, 2002

(54) ANGLE-ADJUSTING AND WALL MOUNTING MECHANISM FOR DESK TOP

(75) Inventor: Hiroshi Yamagishi, Kawasaki (JP)

(73) Assignee: NEC Infrontia Corporation, Kawasaki (JP)

( * ) Notice: Subject to any disclaimer, the term of this patent is extended or adjusted under 35 U.S.C. 154(b) by 0 days.

(21) Appl. No.: 09/545,710

(22) Filed: Apr. 5, 2000

(30) Foreign Application Priority Data

Apr. 14, 1999 (JP) .......................................... 11-107227

(51) Int. Cl.[7] ......................... A47G 29/00; F16M 11/00
(52) U.S. Cl. ......................... 248/685; 248/688; 248/126
(58) Field of Search ................................. 248/310, 685, 248/686, 688, 207, 346.3, 309.1, 126, 291.1

(56) References Cited

U.S. PATENT DOCUMENTS

| | | | |
|---|---|---|---|
| 4,568,801 A | * | 2/1986 | Gates et al. ................ 248/126 |
| 4,940,204 A | * | 7/1990 | Nelson et al. .............. 248/688 |
| 5,087,004 A | * | 2/1992 | Lundell et al. ............. 248/126 |
| 5,807,012 A | * | 9/1998 | Emmert et al. ............. 248/126 |
| 5,823,504 A | * | 10/1998 | Kuwajima ................... 248/685 |

* cited by examiner

Primary Examiner—Ramon O. Ramirez
Assistant Examiner—Jerome A. DeLuca
(74) Attorney, Agent, or Firm—Michael Best & Friedrich LLC; J. Warren Whitesel

(57) ABSTRACT

A pair of slits (2a), a pair of first grooves (2b), a pair of second grooves (2c), and an engaging aperture (2d) are formed to the bottom plate (21) of an outer casing of the telephone set (1). An adapter plate member (3) has a base pate (3a), a pair of generally triangular plates (3b) standing on the base plate, a pair of elastic claws (3c) formed on the top edges of the triangular plates, and a mating tab (3d). One end of the adapter plate member is remobably and rotatably mounted at the front edge of the bottom plate. In a first condition where the telephone set is disposed with the bottom plate is not inclined, the triangular plates are inserted into the slits. In a second condition where the telephone set is disposed with an increased inclined angle, the claws are inserted into first grooves. In a third condition where the telephone set is mounted on a wall by the use of the adapter plate member. After the adapter plate member is removed from the bottom plate, turned upside down, and fixed onto the wall. Then, the tab is inserted and engaged in the aperture of the bottom plate, while each of claws is inserted into each of grooves.

8 Claims, 8 Drawing Sheets

ANGLE-ADJUSTING AND WALL MOUNTING MECHANISM FOR DESK TOP

BACKGROUND OF THE INVENTION

This invention relates to a desk top apparatus such as a telephone set and others, and in particular, to a mechanism for adjusting an angle of a top surface of the desk top apparatus as well as mounting the apparatus on a wall.

Japanese Unexamined Patent Publication No. 79350/1996 (JP-A H08-79350) discloses a telephone set having an adapter wherein an angle adjusting and wall mounting of the telephone set can be realized by changing positions and/or orientation of the adapter to be attached to the telephone set. Specifically, the adapter comprises an angle plate adaptable to be in common fit onto both of a bottom surface and a rear surface of the telephone set so as to maintain the telephone set in a normal condition where the top surface of the telephone set is inclined in relation to a top of the desk by an angle in a design of the telephone set itself. In order to increase the inclined angle of the top surface, the adapter is only attached onto the bottom surface. When the adapter is attached with a different orientation onto the bottom surface of the telephone set, the telephone set can be mounted on the wall by fixing the adapter on the wall.

However, the device disclosed in JP-A H08-79350 has several problems. In order to change the inclined angle of the telephone set, the adapter must be detached from the telephone set and reattached at a different position of the telephone set. This operation would be troublesome for users. If the telephone set is a type which has a telephone cable led out rearward, the cable must be disconnected from the telephone set before detaching of the adapter. Then, the cable must be again connected to the telephone set after the adapter is reattached to a desired position of the telephone set for realizing a desired inclined angle. This is a further troublesome operation.

SUMMARY OF THE INVENTION

It is, therefore, an object of this invention to provide an angle-adjusting and wall-mounting mechanism including an adapter for desk top apparatus which enables to readily adjust the inclined angle of the desk top apparatus without detaching/reattaching of the adapter to the desk top apparatus and without disconnection/connection of an electrical cable to the desk top apparatus.

This invention provides an angle-adjusting and wall mounting mechanism for selectively setting a desk top apparatus with an apparatus top surface in any one condition selected from a first condition where the desk top apparatus is put on a desk with the apparatus top surface being kept in a first angle, a second condition where the desk top apparatus is put on a desk with the apparatus top surface being kept in a second angle larger than the first angle, and a third condition where the desk top apparatus is mounted on a wall. The desk top apparatus has an outer casing with a bottom plate defined by front and rear side edges and left and right side edges. The mechanism comprises an adapter plate member which is removably attached to the bottom plate of the outer casing and comprises a generally rectangular base plate defined by first and second opposite ends and first and second side edges. The bottom plate of the desk top apparatus is provided with:

- a supporting portion formed in the vicinity of the front side edge;
- left and right slits formed in the vicinity of the left and right side edges, respectively;
- left and right first engaging portions formed in the vicinity of the rear side edge and adjacently to the left and right slits, respectively;
- left and right second engaging portions formed apart from the left and right first engaging portions towards the front side edges along the left and right side edges, respectively; and
- a third engaging portion formed in the vicinity of the rear side edge at an intermediate portion between the left and right side edges.

The base plate of the adapter plate member is provided with:

- an engaging portion formed at the first end for being rotatably and removably engaged with the supporting portion so that the adapter plate member is rotatably supported on the bottom plate of the desk top apparatus by the supporting portion, at the first condition and the second condition;
- first and second side plates standing on the base plate at positions of the first and second side edges in the vicinity of the second end for being inserted in the outer casing through the two slits, respectively, at the first condition, the first and second side plates having first and second top ends, respectively;
- first and second mating portions formed on the first and second top ends of the first and second side plates for mating with the left and right first engaging portions, respectively, at the second condition, but mating with the left and right second engaging portions, respectively, at the third condition;
- third mating portion formed at a position apart from the first end towards the second end and intermediate between the first and second side edges for mating with the third engaging portion at the third condition.

DESCRIPTION OF THE PROFFERED EMBODIMENT

Prior to description of embodiments of this invention, the known device disclosed in JP-A 08-79350 will be described with reference to FIGS. 1–6, so as to facilitate understanding of this invention.

Figure 1:
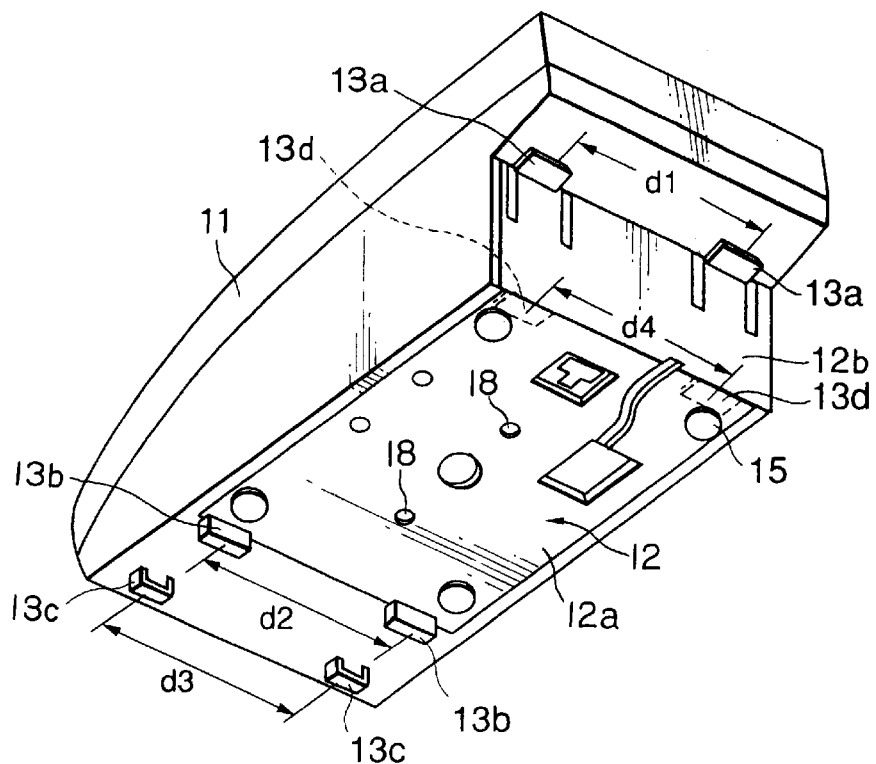
FIG. 1 is a perspective view seen from a rear bottom side of the telephone set with an adapter for angle-adjusting and wall-mounting of the telephone set disclosed in JP-A H08-79350, in a normal condition of the telephone set.
Figure 2:
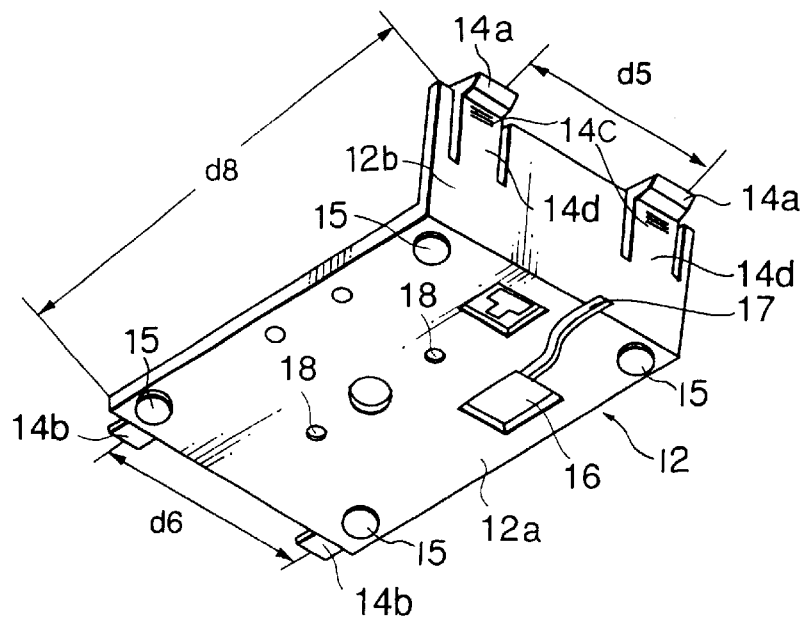
FIG. 2 is a perspective view seen from the rear bottom side of the adapter in FIG. 1.
Figure 3:
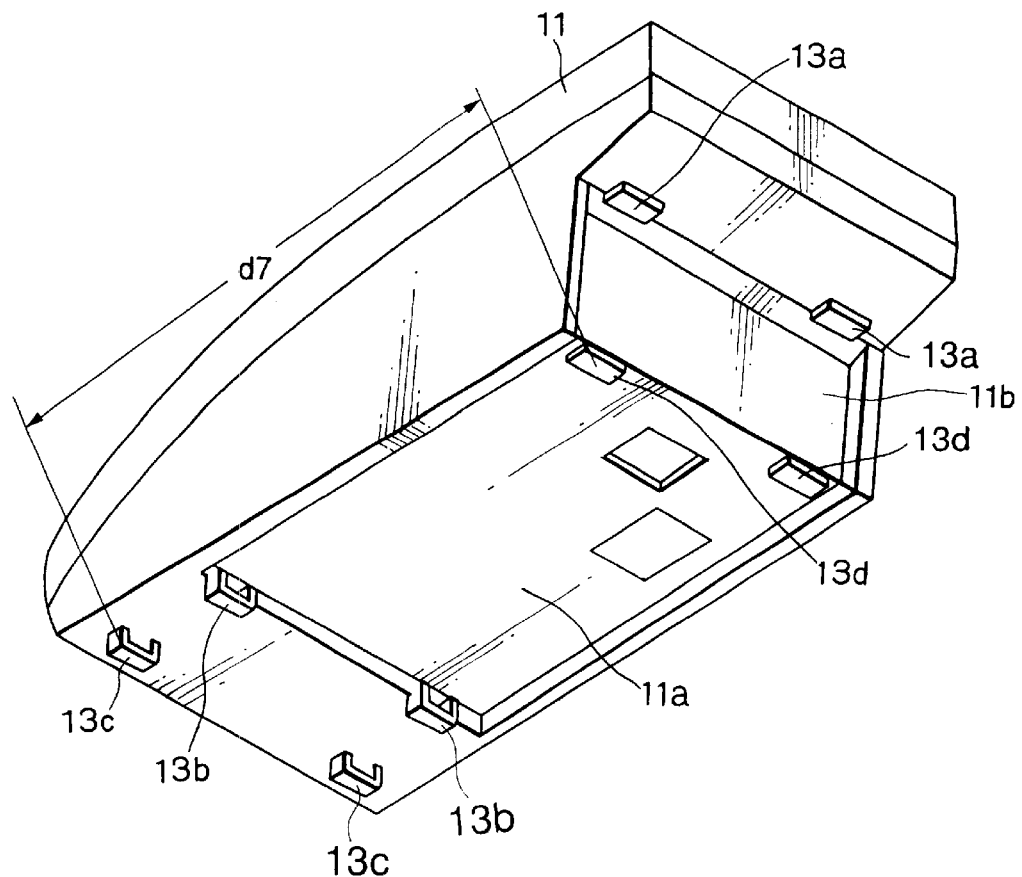
FIG. 3 is a perspective view seen from the rear bottom side of the telephone set in FIG. 1 without the adapter.
Figure 4:
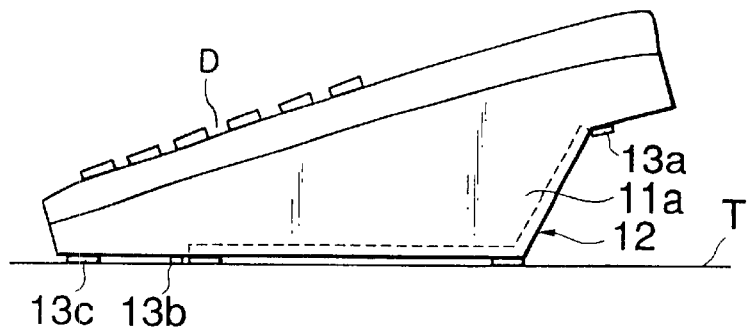
FIG. 4 is a side view of the telephone set in FIG. 1 disposed on a desk with the normal condition.

Referring to FIGS. 1–3, the telephone set shown therein has a housing or an outer casing 11 and an adapter 12. The housing 11 has a bottom surface 11a and a rear surface 11b. The adapter is generally an angle plate which has a base plate section 12a and a slant plate section 12b inclined in relation to the base plate section 12a. As seen in FIGS. 1 and 4, the base plate section 12a and the slant plate section 12b of the adapter 12 are in contact with the bottom surface 11a and the rear surface 11b of the housing 11, respectively, in a first or normal condition where the telephone set attached with the adapter 12 is disposed on a desk T with a top surface of the telephone set inclined to the desk by a normal angle or an angle designed for the telephone set itself.

As seen in FIG. 3, the housing 11 is provided with a pair of first engaging portions 13a on an upper portion of the rear surface 11b in the vicinity of opposite sides. On the bottom surface 11a, there are a pair of second engaging portions 13b at an intermediate position between a front edge and a rear edge of the bottom surface 11a, a pair of third engaging portions 13c in the vicinity of the front edge, and another pair of fourth engaging portions 13d in the vicinity of the rear edge. The paired engaging portions of each pair are disposed at opposite side edges, respectively, as seen in the figure.

The adapter 12 is provided with a pair of first mating portions 14a and a pair of second mating portions 14b at a top end of the slant plate section 12b and a front end of the base plate section 12a, respectively. The first mating portions 14a are selectively engageable or matable with the first engaging portions 13a, the fourth engaging portions 13d, or the third engaging portions 13c. The second mating portions 14b are selectively engageable or matable with the second engaging portions 13b, the third engaging portions 13c, or the fourth engaging portions 13d.

Each distance of each pair of engaging portions 13a, 13a, 13b, 13b, 13c, 13c, and 13d, 13d is assumed d1, d2, d3, and d4, respectively. Further, assuming that each distance of each pair of mating portions 14a, 14a and 14b, 14b is d5 and d6, respectively, the following formula is formed.

$$d1=d2=d3=d4=d5=d6$$

In the first or normal condition shown in FIG. 4, the first mating portions 14a and the second mating portions 14b are fitted with the first engaging portions 13a and the second engaging portions 13b, respectively.

In the housing 11, the distance d7 between the third engaging portions 13c and the fourth engaging portions 13d is equal to the distance in the straight line d8 between the first mating portions 14a and the second mating portions 14b.

Figure 5:
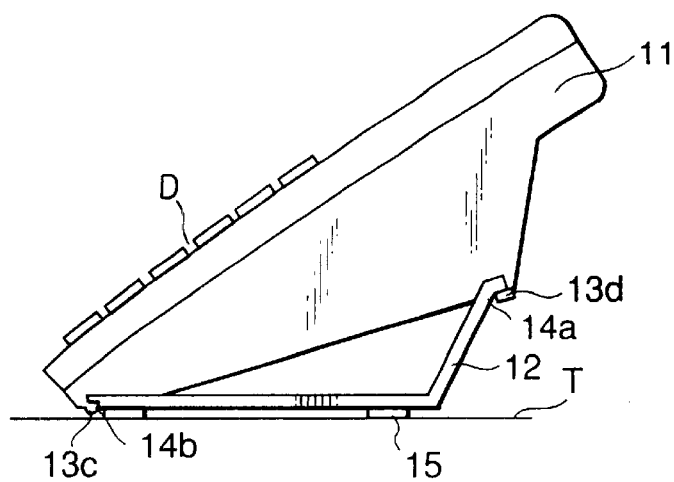
FIG. 5 is a side view of the telephone set FIG. 1 disposed on the desk with an increased inclined angle by the adapter being attached at a different position of the telephone set.
Figure 6:
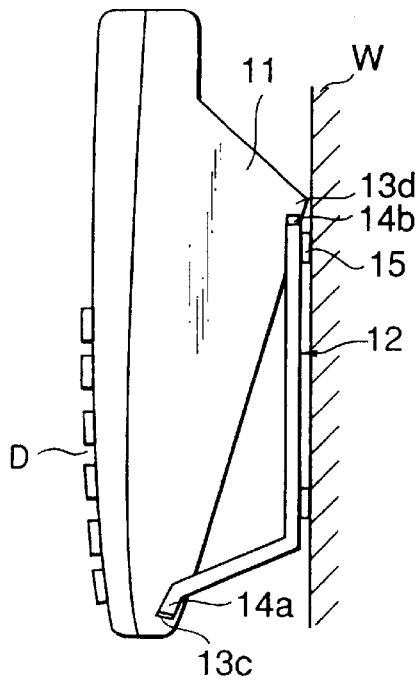
FIG. 6 is a side view of the telephone set FIG. 1 mounted on a wall by use of the adapter.

The adapter 12 is provided with four rubber pads 15 on the bottom side of the base plate section 12a for stably supporting the telephone set on the desk T (FIGS. 4 and 5) or the wall W (FIG. 6). The adapter 12 is further provided with a hole 16 in the base plate section 12a which a telephone cable is led out by passing through, and a groove 17 in the bottom side of the base plate section 12a for holding the telephone cable therein.

The housing 11 is formed with depressed portions in the bottom surface 11a and the rear surface 11b for receiving the base plate section 12a and the slant plate section 12b, respectively, in the first condition.

In order to change the telephone set from the first condition shown in FIG. 4 into the second condition shown in FIG. 5 where the telephone set is disposed with an increased inclined angle on the desk, the adapter 12 is removed or detached from the telephone set and, then, reattached to the telephone set so that the first mating portions 14a and the second mating portions 14b engage with the fourth engaging portion 13d and the third engaging portions 13c, respectively. Thereupon, the height of the slant plate section 12b of the adapter 12 is generally added to that of the rear portion of the telephone set. Accordingly, when the telephone set is put on the desk T, the telephone set is stabilized with an increased inclined angle.

In order to mount the telephone set on the wall W as seen in FIG. 6 (third condition), the adapter 12 is also removed or detached from the telephone set at the first condition (FIG. 4) or the second condition (FIG. 5). Then, the adapter 12 is fixedly mounted to the wall and thereafter attached to the telephone set with the first mating portions 14a and the second mating portions 14b being fitted with the third engaging portions 13c and the fourth engaging portions 13d, respectively. The adapter 12 is formed with two screw-holes 18 (FIGS. 1 and 2) in the base plate section 12a and is fixed on the wall W by means of two screws (not shown) so that the mating portions 14a are placed at the relatively lower side and the mating portions 14b are placed at the relatively upper side.

The telephone set with the adapter disclosed in JP-A H08-79350 has problems as described in the preamble.

Now, description will be made as to the telephone set with the angle-adjusting and wall-mounting adapter according to an embodiment of this invention, with reference to FIGS. 7–12B.

Figure 10:
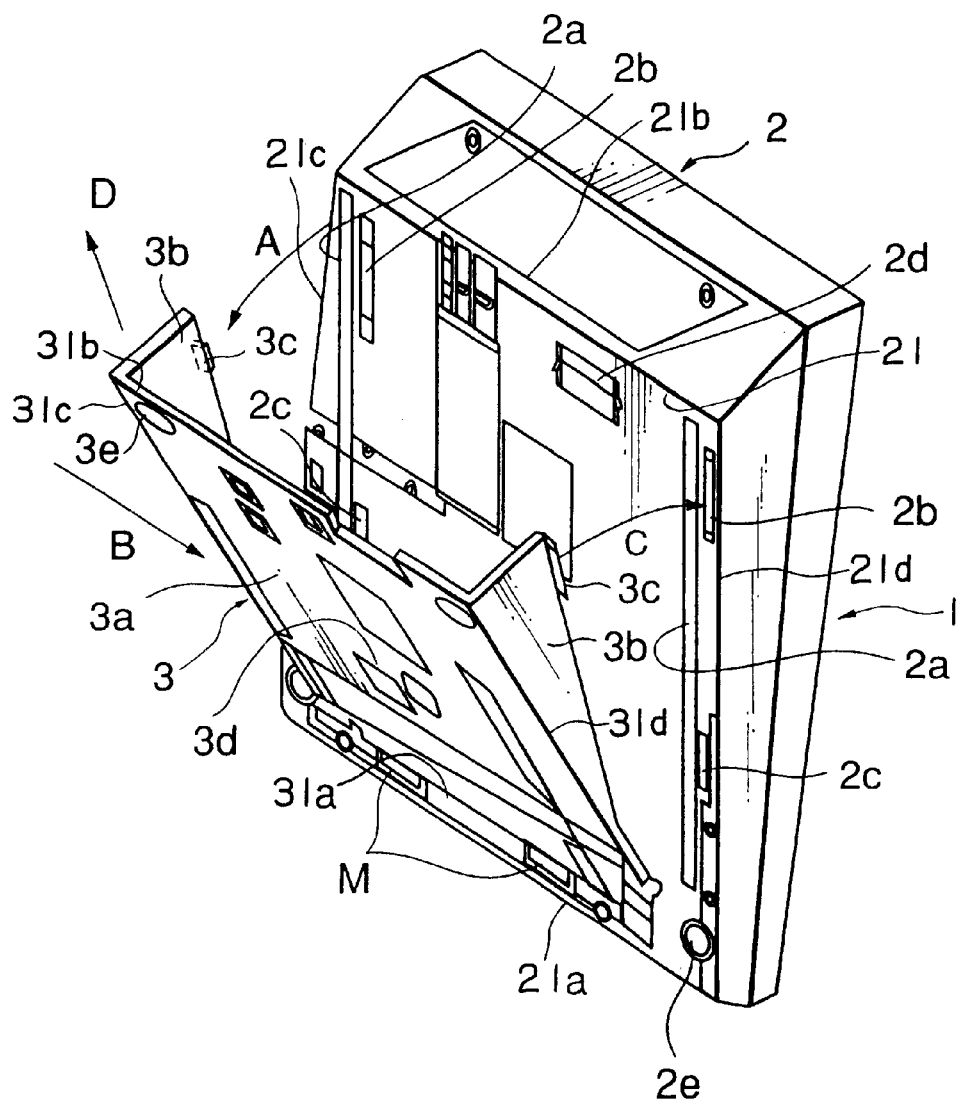
FIG. 10 is a perspective view seen from the rear bottom side of the telephone set of FIG. 7 with the adapter being shown in a condition just before attached to the telephone set into the first or second condition shown in FIG. 7 or 8.
Figure 11:
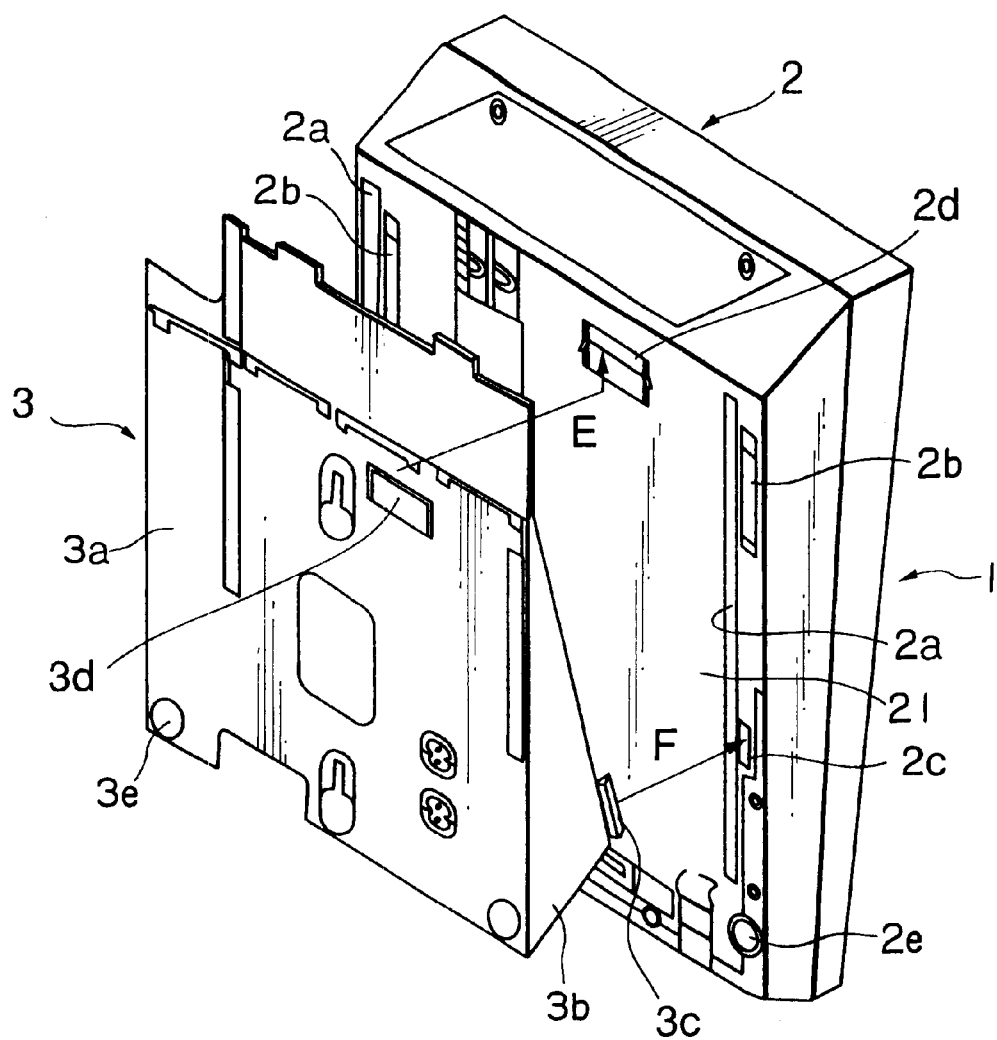
FIG. 11 is a perspective view seen from the rear bottom side of the telephone set of FIG. 7 with the adapter being shown in a condition just before attached to the telephone set into the third condition shown in FIG. 9.

As seen in the figures, especially FIG. 10, the telephone set 1 shown therein has a housing or an outer casing 2, made of, typically, plastic. The outer casing 2 has a bottom plate 21 defined by front and rear side edges 21a and 21b and left and right side edges 21c and 21d. The telephone set 1 has an angle-adjusting and wall-mounting mechanism which comprises an adapter plate member 3 removably attached to the bottom plate 21 of the outer casing 2. The adapter plate member 3 comprises a generally rectangular base plate 3a which is made of, for example, plastic, and is defined by first and second opposite ends 31a and 31b and first and second side edges 31c and 31d.

The bottom plate 21 of the telephone set 1 is provided with a supporting portion 2f formed in the vicinity of the front side edge 21a. In the bottom plate 21, left and right slits 2a are formed in the vicinity of the left and right side edges 21c and 21d, respectively. Further, left and right first engaging portions 2b are formed on the bottom plate 21 in the vicinity of the rear side edge 21b and adjacently to the left and right slits 2a, respectively. And left and right second engaging portions 2c are also formed apart from the left and right first engaging portions 2b towards the front side edges 21a along the left and right side edges 21c and 21d, respectively. Moreover, a third engaging portion 2d is formed on the bottom plate 21 in the vicinity of the rear side edge 21b at an intermediate portion between the left and right side edges 21c and 21d.

The base plate 3a of the adapter plate member 3 is provided with an engaging portion 3f formed at the first end 31a which is rotatably and removably engaged with the supporting portion 2f. Thus, the adapter plate member 3 is rotatably supported on the bottom plate 21 of the telephone set 1 by the supporting portion 2f, at the first condition and the second condition.

First and second side plates 3b stand on the base plate 3a at positions of the first and second side edges 31c and 31d in the vicinity of the second end 31b, and is inserted in the outer casing 2 through the two slits 2a, respectively, at the first condition. The first and second side plates 3b have first and second top ends, respectively.

First and second mating portions 3c are formed on the first and second top ends of the first and second side plates 3b and mate with the left and right first engaging portions 2b, respectively, at the second condition. However, the first and second mating portions 3c mate with the left and right second engaging portions 2c, respectively, at the third condition.

Further, third mating portion 3d is formed at a position apart from the first end 31a towards the second end and intermediate between the first and second side edges 31c and 31d for mating with the third engaging portion 2d at the third condition.

Figure 12A:
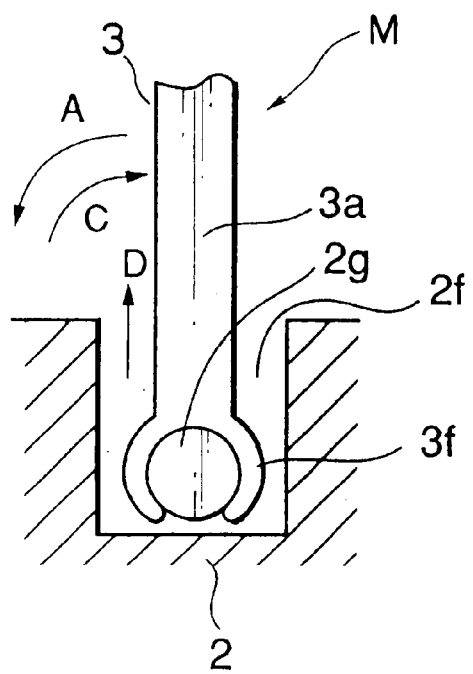
FIG. 12A is an enlarged sectional view of a structure for rotatably supporting the adapter to a bottom plate of the telephone set of FIG. 7.
Figure 12B:
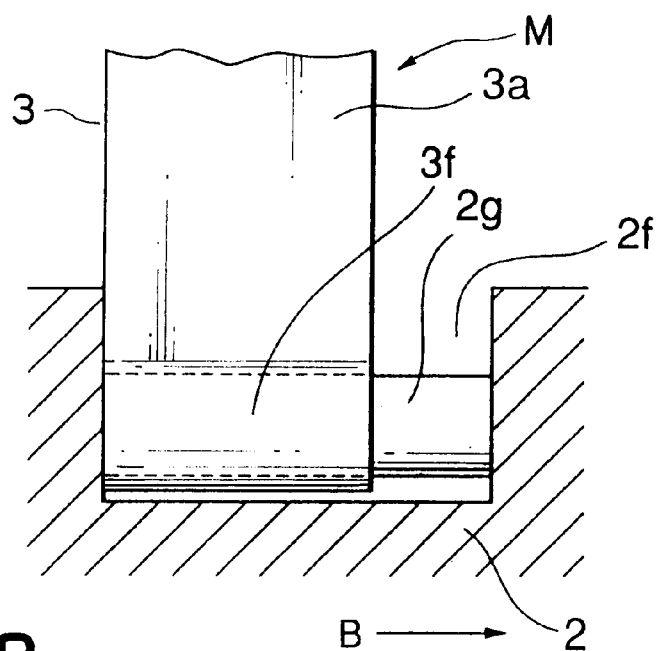
FIG. 12B is an enlarged front side sectional rear view of the structure of FIG. 12A.

Referring to FIGS. 12A and 12B, the supporting portion 2f comprises a round bar 2g extending along the front edge 21a and having opposite ends fixed to the bottom plate 21. The engaging portion 3f for mating with the supporting portion 2f comprises a ring-like snap comprising a pair of elastic curved tabs shown at 3f projecting from the first end 31a with opposite curvatures and confronting to each other. The ring-like snap is snapped on and out the round bar 2g.

In the example shown in the figures, the bottom plate 21 is provided with a recess in which the round bar 2g is disposed, as shown in FIGS. 12A and 12B. Further, the supporting portion 2f and engaging portion 3f are shown as two sections. Thus, the round bar 2g comprises two bar sections located at two positions separated away from each other along the front side edge 21a. The ring-like snap 3f also comprises two snap sections located at two positions separated away from each other along the first end 31a. The two snap sections are snapped on and out the two bar sections, respectively. Therefore, the adapter plate member 3 is rotatably, slidably, and removably connected to the bottom plate 21 at two engagements shown at M and formed by the two bar sections and the two ring-like snap section.

In the shown embodiment, each of the left and right first engaging portions 2b and each of the left and right second engaging portions 2c are shown as grooves formed in a bottom outer surface of the bottom plate 21. The grooves 2b and 2c extend along the left and right side edges. On the other hand, each of the first and second mating portions 3c is formed as a claw which can be fit in the groove 2b and 2c. The groove and the claw establish a removable engagement like a key and key-groove connection.

In the shown example, the third engaging portion 2d is formed as a tab extending towards the rear side edge 21b, and the third mating portion 3d is formed as an aperture in the bottom plate 21 for receiving the tab.

In the shown embodiment, each of the first and second side plates 3b is a generally triangular plate having a bottom edge connected to a corresponding one of the first and second side edges 31c and 31d, a standing edge standing on the base plate 3a at a corner of the second end 31b and the corresponding one of the first and second side edges 31c and 31d, and a top edge. The triangular plate 3b is provided with a corresponding one of the first and second mating portions or claws 3c on the top edge in the vicinity of the standing edge.

As shown in the figures, the bottom plate 21 is preferably provided with two rubber pads 2e in the vicinity of two corners of the front side edge 21a and left and right side edges 21c and 21d. Also, the base plate 3a is preferably provided with two rubber pads 2e in the vicinity of two corners of the first ends 31a and first and second side edges 31c and 31d.

The first, second and third conditions of telephone set 1 will be described below.

Figure 7:
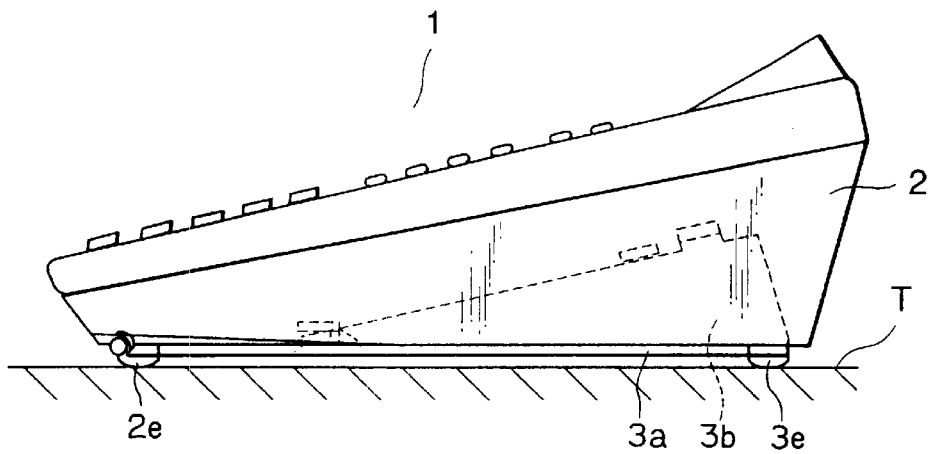
FIG. 7 is a side view of a telephone set having an angle-adjusting and wall-mounting mechanism including an adapter according to an embodiment of this invention which is in a first or normal condition where the telephone set is disposed on a desk with a normal inclined angle.

Firstly, referring to FIG. 7, telephone set 1 is disposed on the desk T in the first condition. In FIG. 10, the adapter plate member 3 is rotated at the rotatable engagements M between the supporting portion or round bar 2g and the engaging portion or ring-like snap 3f. Then, the left and right triangular plate 3b are inserted into the left and right slits 2a, respectively. Thereupon, since each claw 3c is brought into close contact with the inside of each of slits 2a by its elasticity, the adapter plate member 3 engages with the outer casing 2 and does not disengage from the outer casing 2 toward the A direction. Therefore, the telephone set 1 is kept on the desk T in the state shown in FIG. 7.

Figure 8:
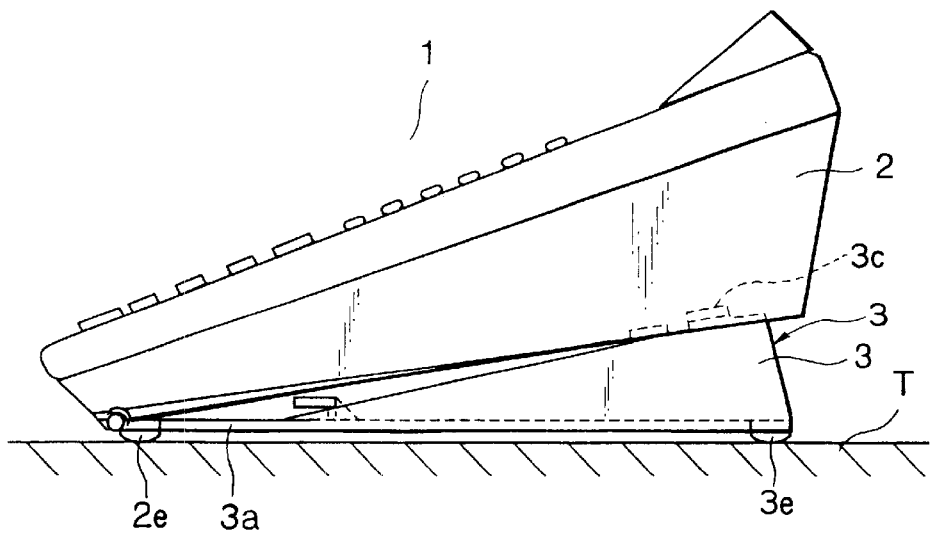
FIG. 8 is a side view of the telephone set of FIG. 7 in a second condition where the telephone set is disposed on the desk with an increased inclined angle by use of adapter.

Next, referring to FIG. 8, the telephone set 1 is disposed on the desk T in the second condition. In FIG. 10, the adapter plate member 3 is rotated at the rotatable engagements M toward the A direction against the friction force between each of claws 3c and each of slits 2a. Continuously, the adapter plate member 3 is slid by guide of the round bar 2g of the rotatable engagements M toward the B direction. Further, the adapter plate member 3 is rotated at the rotatable engagements M toward the C direction. So that the first and second mating portions or claws 3c are inserted into the left and right second engaging portions or grooves 2b of the outer casing 2, respectively. Thereupon, since each of the claws 3c is brought into close contact with the inside of each of the grooves 2b by its elasticity, the adapter plate member 3 engages with the outer casing 2 and does not disengage from the outer casing 2 toward the A direction. Consequently, the telephone set 1 is kept on the desk T in the state shown in FIG. 8.

Figure 9:
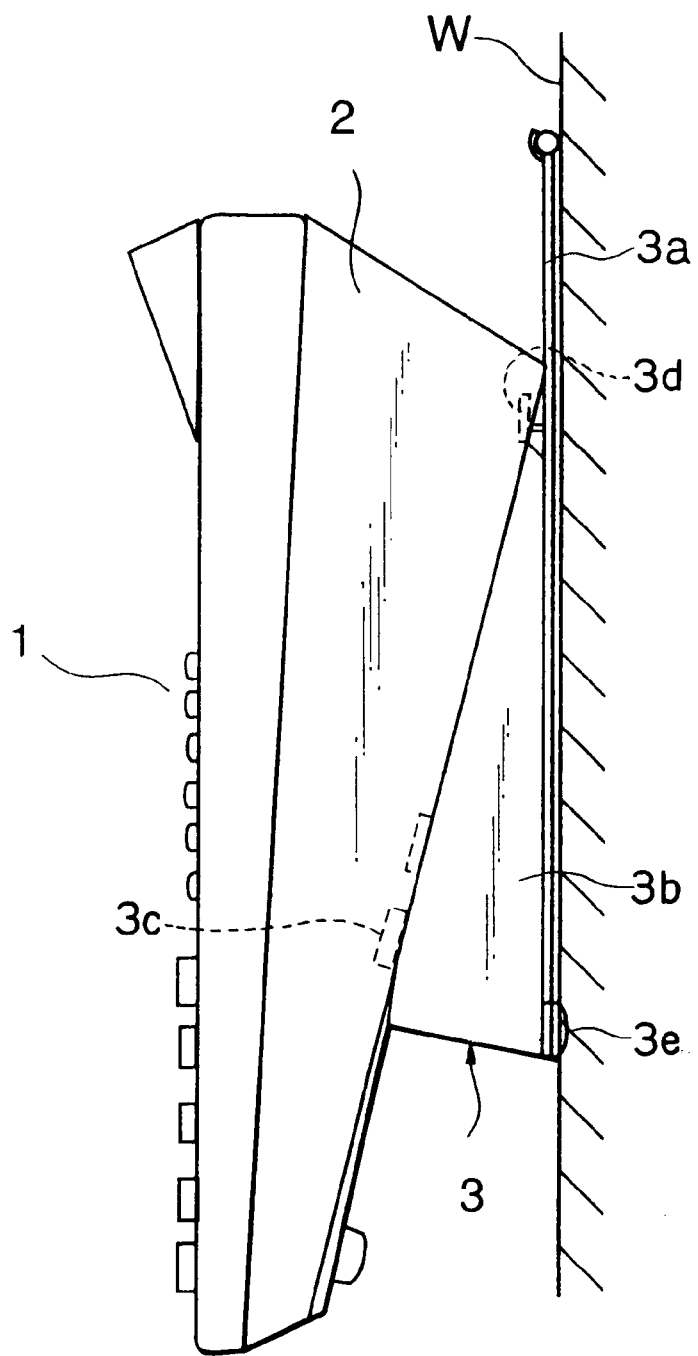
FIG. 9 is a side view of the telephone set of FIG. 7 in a third condition where the telephone set is mounted on a wall by use of the adapter.

Next, the third condition of the telephone set is described with reference to FIG. 9 in which the telephone set 1 is mounted on the wall W by use of the adapter plate member 3. In FIG. 10, the adapter plate member 3 is pulled against the outer casing 2 toward the D direction. Thereupon, the ring-like snap 3f disengages from the round bar 2g, and the adapter plate member 3 disengages or detached from the outer casing 2. The adapter plate member 3 is turned upside down and is fixedly mounted on the wall W by screws in the similar manner as in conventional one. Then, the tab or bent projection 3d as the third mating portion is engaged with the aperture 2d as the engaging portion 2d of the bottom plate 21 of the outer casing 2 toward the E direction. Then, each of claws 3c is inserted into each of grooves 2c toward the F direction. Thereupon, since each of claws 3c is brought into close contact with the inside of each of grooves 2c by its elasticity, the adapter plate member 3 engages with the outer casing 2. Consequently, the telephone set 1 is mounted on the wall W in the state shown in FIG. 9.

In the above, the embodiment has been description in connection with the telephone set as the desk top apparatus. However, this invention is not restricted to the telephone set but is applicable to other desk top type apparatus.

As will be clear from the above description, this invention has the following technical merits.

1. Since the telephone cable or wiring cable etc. do not need to be removed from the desk top apparatus such as the telephone set, the angle of a top face or a dial plate thereof can be adjusted by simple and easy operation. Further, the desk top apparatus can be easily mounted on the wall.

2. Since the side surfaces of the desk top apparatus are not provided with any engaging structure such as grooves, holes, etc., the appearance of the apparatus is presentable.

3. As compared with the conventional angle-adjustable and wall-mountable telephone set, the angle-adjusting and wall-mounting mechanism of this invention is simple in structure.

What is claimed is:

1. An angle-adjusting and wall mounting mechanism for selectively setting a desk top apparatus with an apparatus top surface in any one condition selected from a first condition where said desk top apparatus is put on a desk with said apparatus top surface being kept in a first angle, a second condition where said desk top apparatus is put on a desk with said apparatus top surface being kept in a second angle larger than said first angle, and a third condition where said desk top apparatus is mounted on a wall, said desk top apparatus having an outer casing with a bottom plate defined by front and rear side edges and left and right side edges, said mechanism comprising an adapter plate member removably attached to a bottom plate of said outer casing and comprising a generally rectangular base plate defined by first and second opposite ends and first and second side edges, wherein:

said bottom plate of said desk top apparatus is provided with:

a supporting portion formed in the vicinity of said front side edge;

left and right slits formed in the vicinity of said left and right side edges, respectively;

left and right first engaging portions formed in the vicinity of said rear side edge and adjacently to said left and right slits, respectively;

left and right second engaging portions formed apart from said left and right first engaging portions towards said front side edges along said left and right side edges, respectively; and a third engaging portion formed in the vicinity of said rear side edge at an intermediate portion between said left and right side edges; and wherein:

said base plate of said adapter plate member is provided with:

an engaging portion formed at said first end for being rotatably and removably engaged with said supporting portion so that said adapter plate member is rotatably supported on said bottom plate of said desk top apparatus by said supporting portion, at said first condition and said second condition;

first and second side plates standing on said base plate at positions of said first and second side edges in the vicinity of said second end for being inserted in said outer casing through said two slits, respectively, at said first condition, said first and second side plates having first and second top ends, respectively;

first and second mating portions formed on said first and second top ends of said first and second side plates for mating with said left and right first engaging portions, respectively, at said second condition, but mating with said left and right second engaging portions, respectively, at said third condition;

a formed at a position apart from said first end towards the second end and intermediate between said first and second side edges for mating with said third engaging portion at said third condition.

2. An angle-adjusting and wall mounting mechanism as claimed in claim 1, wherein said supporting portion comprises a round bar extending along said front edge and having opposite ends fixed to the bottom plate, and said engaging portion comprises a ring-like snap comprising a pair of elastic curved tabs projecting from said first end with opposite curvatures and confronting to each other, said ring-like snap being snapped on and out said round bar.

3. An angle-adjusting and wall mounting mechanism as claimed in claim 2, said round bar comprises two bar sections located at two positions along said front side edge, and said ring-like snap also comprises two snap sections located at two positions separated away from each other along said first end, said two snap sections being snapped on and out said two bar sections, respectively.

4. An angle-adjusting and wall mounting mechanism as claimed in claim 2, wherein said bottom plate has a bottom outer surface, and each of said left and right first engaging portions and said left and right second engaging portions comprises a groove formed in said bottom outer surface and extending along said left and right side edges, and wherein each of said first and second mating portions comprises a claw for being fittable in said groove, said groove and said claw establishing a removable engagement by a key and key-groove connection.

5. An angle-adjusting and wall mounting mechanism as claimed in claim 2, wherein said third mating portion comprises a tab extending towards said first end, and wherein said third engaging portion comprises an aperture formed in said bottom plate for receiving said tab.

6. An angle-adjusting and wall mounting mechanism as claimed in claim 1, wherein each of said first and second side plates is a generally triangular plate having a bottom edge connected to a corresponding one of said first and second side edges, a standing edge standing on said base plate at a corner of said second end and said corresponding one of said first and second side edges, and a top edge, said triangular plate being provided with a corresponding one of said first and second mating portions on said top edge in the vicinity of said standing edge.

7. An angle-adjusting and wall mounting mechanism as claimed in claim 1, wherein said bottom plate is provided with two rubber pads in the vicinity of two corners of said front side edge and left and right side edges.

8. An angle-adjusting and wall mounting mechanism as claimed in claim 1, wherein said base plate is provided with two rubber pads in the vicinity of two corners of said second ends and first and second side edges.

* * * * *